(12) United States Patent
Wagner

(10) Patent No.: US 7,922,993 B2
(45) Date of Patent: *Apr. 12, 2011

(54) SPHERICAL CARBON NANOSTRUCTURE AND METHOD FOR PRODUCING SPHERICAL CARBON NANOSTRUCTURES

(75) Inventor: Anthony S. Wagner, Buchanan Dam, TX (US)

(73) Assignee: Clean Technology International Corporation, Little Rock, AR (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/430,743

(22) Filed: May 9, 2006

(65) Prior Publication Data

US 2007/0116633 A1 May 24, 2007

Related U.S. Application Data

(63) Continuation-in-part of application No. 11/173,419, filed on Jul. 1, 2005, now abandoned, and a continuation-in-part of application No. 10/887,695, filed on Jul. 9, 2004, now Pat. No. 7,550,128.

(51) Int. Cl.
B01J 19/08 (2006.01)

(52) U.S. Cl. .............. 423/445 B; 423/447.1; 423/447.3; 977/842; 977/844; 110/235; 110/237; 110/243

(58) Field of Classification Search .............. 423/445 B, 423/460, 461, DIG. 12, 447.1, 447.3; 110/235, 110/237; 977/243, 842, 844
See application file for complete search history.

(56) References Cited

U.S. PATENT DOCUMENTS

| 3,066,099 A | 11/1962 | Mohun |
| 4,357,234 A | 11/1982 | Inculet et al. |
| 4,663,230 A | 5/1987 | Tennent |
| 5,000,101 A | 3/1991 | Wagner |
| 5,094,906 A | 3/1992 | Witzke et al. |
| 5,167,919 A | 12/1992 | Wagner |
| 5,271,341 A | 12/1993 | Wagner |
| 5,346,683 A | 9/1994 | Green et al. |
| 5,359,947 A | 11/1994 | Wagner |
| 5,424,054 A | 6/1995 | Bethune et al. |

(Continued)

FOREIGN PATENT DOCUMENTS

WO  WO 2006/085969 A2  8/2006

OTHER PUBLICATIONS

Dresselhaus, et al., Fullerenes, J. Mater. Res. 1993; 8(8): 2054-2097.*

(Continued)

Primary Examiner — Stanley S. Silverman
Assistant Examiner — Daniel C. McCracken
(74) Attorney, Agent, or Firm — Russell D. Culbertson; The Culbertson Group, P.C.

(57) ABSTRACT

A method for producing carbon nanostructures according to the invention includes injecting acetylene gas into a reactant liquid. The injected acetylene molecules are then maintained in contact with the reactant liquid for a period of time sufficient to break the carbon-hydrogen bonds in at least some of the acetylene molecules, and place the liberated carbon ions in an excited state. This preferred method further includes enabling the liberated carbon ions in the excited state to traverse a surface of the reactant liquid and enter a collection area. Collection surfaces are provided in the collection area to collect carbon nanostructures.

18 Claims, 13 Drawing Sheets

U.S. PATENT DOCUMENTS

| | | | |
|---|---|---|---|
| 5,431,113 | A | 7/1995 | Wagner |
| 5,452,671 | A | 9/1995 | Wagner |
| 5,457,343 | A | 10/1995 | Ajayan et al. |
| 5,461,991 | A | 10/1995 | Wagner |
| 5,482,601 | A | 1/1996 | Ohshima et al. |
| 5,489,477 | A | 2/1996 | Ohta et al. |
| 5,553,558 | A | 9/1996 | Wagner |
| 5,560,898 | A | 10/1996 | Uchida et al. |
| 5,564,351 | A | 10/1996 | Wagner |
| 5,640,702 | A | 6/1997 | Shultz |
| 5,641,466 | A | 6/1997 | Ebbesen et al. |
| 5,695,734 | A | 12/1997 | Ikazaki et al. |
| 5,698,175 | A | 12/1997 | Hiura et al. |
| 5,753,088 | A | 5/1998 | Olk |
| 5,832,845 | A | 11/1998 | Wagner |
| 5,876,684 | A * | 3/1999 | Withers et al. ............ 423/445 B |
| 6,037,517 | A | 3/2000 | Wagner |
| 6,069,290 | A | 5/2000 | Wagner |
| 6,195,382 | B1 | 2/2001 | Wagner |
| 6,227,126 | B1 * | 5/2001 | Wagner .................. 110/250 |
| 6,256,466 | B1 | 7/2001 | Ota et al. |
| 6,270,735 | B2 | 8/2001 | Wagner |
| 6,303,094 | B1 | 10/2001 | Kusunoki et al. |
| 6,333,016 | B1 | 12/2001 | Resasco et al. |
| 6,346,221 | B1 | 2/2002 | Wagner |
| 6,355,857 | B1 | 3/2002 | Wagner |
| 6,451,175 | B1 | 9/2002 | Lal |
| 6,455,021 | B1 | 9/2002 | Saito |
| 6,669,755 | B2 | 12/2003 | Wagner |
| 6,683,783 | B1 | 1/2004 | Smalley et al. |
| 6,717,026 | B2 | 4/2004 | Wagner |
| 6,740,224 | B1 | 5/2004 | Benavides et al. |
| 6,740,403 | B2 | 5/2004 | Gogotsi et al. |
| 6,761,871 | B2 | 7/2004 | Little |
| 6,765,949 | B2 | 7/2004 | Chang |
| 6,841,003 | B2 | 1/2005 | Kang et al. |
| 6,843,850 | B2 | 1/2005 | Avouris et al. |
| 6,929,676 | B2 | 8/2005 | Wagner |
| 7,034,197 | B2 | 4/2006 | Wagner |
| 7,365,237 | B2 | 4/2008 | Wagner |
| 7,449,156 | B2 | 11/2008 | Wagner |
| 2002/0102193 | A1 | 8/2002 | Smalley et al. |
| 2002/0127169 | A1 | 9/2002 | Smalley et al. |
| 2002/0159943 | A1 | 10/2002 | Smalley et al. |
| 2003/0109768 | A1 | 6/2003 | Wagner |
| 2003/0129119 | A1 | 7/2003 | Chiu et al. |
| 2004/0057896 | A1 | 3/2004 | Kronholm et al. |
| 2005/0261760 | A1 | 11/2005 | Weber |
| 2006/0008403 | A1 | 1/2006 | Wagner |
| 2006/0008405 | A1 | 1/2006 | Wagner |
| 2006/0008406 | A1 | 1/2006 | Wagner |
| 2006/0021510 | A1 | 2/2006 | Henley et al. |
| 2006/0034746 | A1 | 2/2006 | Wagner |
| 2008/0050303 | A1 | 2/2008 | Wagner |
| 2008/0056980 | A1 | 3/2008 | Wagner |

OTHER PUBLICATIONS

Bogdanov, et al., Development Prospects of the Commercial Production of Fullerenes, Technical Physics 2000; 45(5): 521-527.*

Ru, et al., Attraction and orientation phenomena of bucky onions formed in a transmission electron microscope, Chemical Physics Letters 1996; 259: 425-431.*

Kasatochkin, et al., On crystalline Structure of Carbyne, Carbon 1973; 11: 70-72.*

Levesque, A., Binh, Vu Thien, Semet V., Guillot, D., Fillit, R.Y., Brookes, M.D., and Nguyen, T. P., "Monodisperse carbon nanopearls in a foam-like arrangement: a new carbon nano-compound for cold cathodes", Jul. 28, 2004, Available at <http://www.sciencedirect.com.> (7 pages).

International Search Report for PCT/US2007/067794 dated Apr. 30, 2008 (2 Pages).

Written Opinion of the International Search Authority (PCT Rule 43bis. 1) for PCT/US2007/067794 dated Apr. 30, 2008 (6 Pages).

Dresselhaus et al., "Introduction to Carbon Materials Research," Topics Applied Physics, vol. 80 (2001), pp. 1-9.

Dresselhaus et al., "Relation of Carbon Nanotubes to Other Carbon Materials," Topics Applied Physics, vol. 80 (2001), pp. 11-28.

Communication pursuant to Article 153(7) EPC dated Feb. 11, 2009 (European Application No. 05857563.0-1218)(8 Pages).

Communication pursuant to Article 153(7) EPC dated Feb. 12, 2009 (European Application No. 05857494.8-1218)(7 Pages).

Written Opinion of the International Search Authority (PCT Rule 43bis. 1) for PCT/US2005/23370 dated Sep. 20, 2006 (4 Pages).

International Search Report for PCT/US2005/23370 dated Sep. 20, 2006 (2 Pages).

Dai, "Carbon nanotubes: opportunities and challenges," Elsevier, Surface Science, vol. 500 (2002), 24 pages.

Dresselhaus et al., "Carbon Nanotubes Synthesis, Structure, Properties, and Applications," Topics of Applied Physics, Springer (2001), 7 pages.

Height et al., "Flame synthesis of single-walled carbon nanotubes," Elsevier, Carbon, vol. 24 (2004), 13 pages.

Journet et al., "Large-scale production of single-walled carbon nanotubes by the electric-arc technique," Nature, vol. 388 (Aug. 21, 1997), 3 pages.

Journet et al., "Production of carbon nanotubes," Applied Physics A, Materials Science & Processing, vol. 67 (1998), 9 pages.

Mamalis et al., "Nanotechnology and nanostructured materials: trends in carbon nanotubes," Elsevier, Precision Engineering, vol. 28 (2004), 15 pages.

International Search Report for PCT/US2005/029085 dated Sep. 5, 2006, 2 pages.

Written Opinion of the International Search Authority (PCT Rule 43bis. 1) for PCT/US2005/029085 dated Sep. 5, 2006, 3 pages.

International Search Report for PCT/US2005/045334 dated May 19, 2008, 2 pages.

Written Opinion of the International Search Authority (PCT Rule 43bis. 1) for PCT/US2005/045334 dated May 19, 2008, 5 pages.

International Search Report for PCT/US2006/023962 dated Jul. 18, 2008, 2 pages.

Written Opinion of the International Search Authority (PCT Rule 43bis. 1) for PCT/US2006/023962 dated Jul. 18, 2008, 4 pages.

Wagner, "Method and Apparatus for Producing Carbon Nanostructures," filed Oct. 31, 2007, U.S. Appl. No. 11/931,802, 30 pages.

Wagner, "Method and Apparatus for Preparing a Collection Surface for Use in a Produccing Carbon Nanostructures," filed Oct. 31, 2007, U.S. Appl. No. 11/932,020, 34 pages.

* cited by examiner

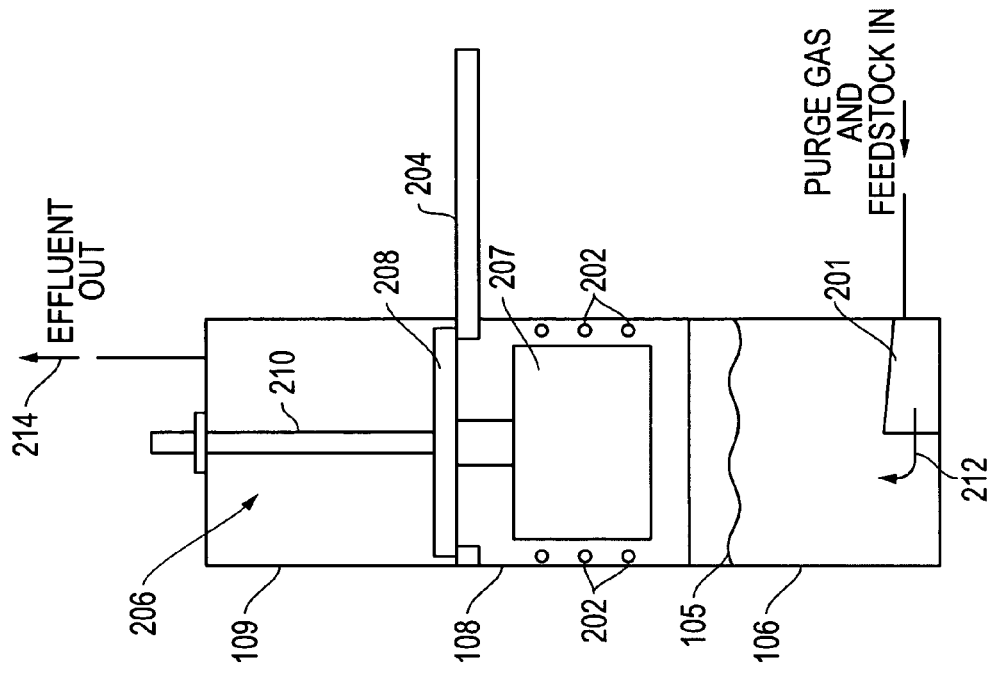
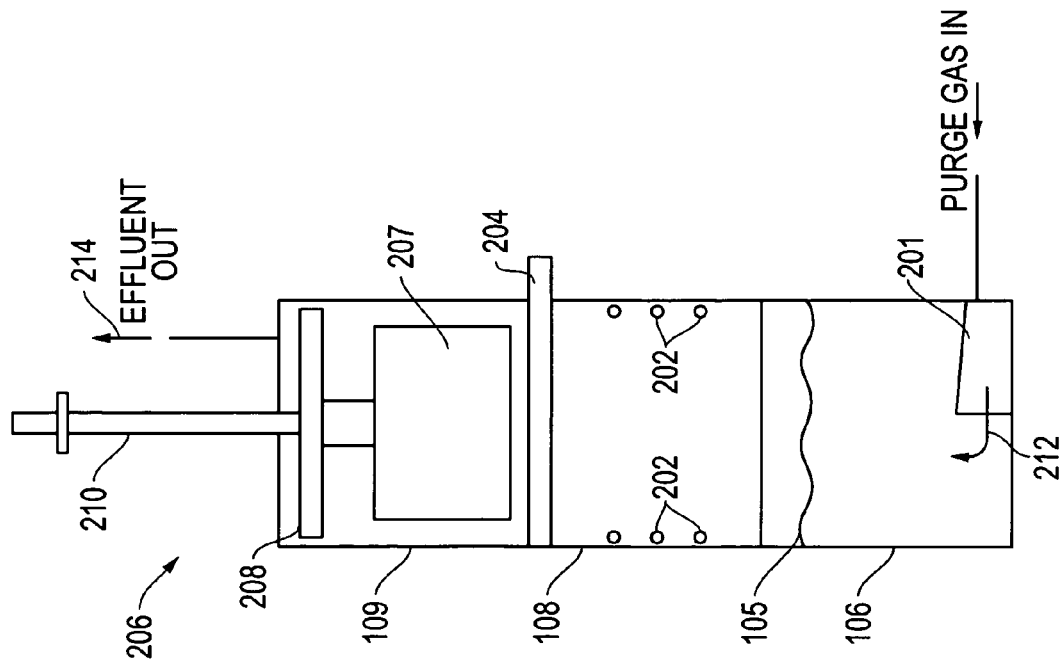
FIG. 2
FIG. 3

SPHERICAL CARBON NANOSTRUCTURE AND METHOD FOR PRODUCING SPHERICAL CARBON NANOSTRUCTURES

CROSS-REFERENCE TO RELATED APPLICATIONS

This application is a continuation-in-part of U.S. patent application Ser. No. 10/887,695, filed Jul. 9, 2004 now U.S. Pat. No. 7,550,128 entitled "Method and Apparatus for Producing Carbon Nanostructures," and U.S. patent application Ser. No. 11/173,419, filed Jul. 1, 2005 now abandoned entitled "Reactant Liquid System for Facilitating the Production of Carbon Nanostructures." The Applicant claims the benefit of each of these applications under 35 U.S.C. §120. The entire content of each of these applications is incorporated herein by this reference.

TECHNICAL FIELD OF THE INVENTION

The present invention relates to methods for manufacturing carbon nanostructures having a highly ordered spherical form. In particular, the invention relates to methods for placing carbon atoms in condition to form impurity-free, spherical carbon nanostructures. The invention also includes a particular spherical carbon nanostructure.

BACKGROUND OF THE INVENTION

Carbon nanostructures have received a great deal of interest since their discovery. It has been suggested that carbon nanostructures may have important applications in electronics, in materials sciences, and in a number of additional fields. As used in this disclosure, a "carbon nanostructure" comprises a structure made up of chemically bonded carbon atoms, with or without impurities or intentionally added materials incorporated in the carbon structure or adjacent to the carbon structure. Carbon nanostructures include structures in which carbon atoms are arranged in generally a series of interconnected carbon arrays formed into a tube, cylinder, sphere, crystal, sheet or other structure. Carbon nanostructures may be single walled or multiple walled nanotubes, nanofibers, nanorope, spheres, crystals, or nanowire. Single wall nanotubes include a single layer of the hexagonally arranged carbon atoms, while multiple walled nanotubes are made up of an inner layer of carbon atoms and a series of one or more outer layers of hexagonally arranged carbon atom structures.

Despite the interest in carbon nanostructures and the potentially important uses for such structures, the practical application of carbon nanostructures in products has been slowed by the difficulty in manufacturing such structures. Two general types of processes have been employed to produce or isolate carbon nanostructures. One process type uses a plasma arc between carbon electrodes. U.S. Pat. Nos. 5,482,601 and 5,753,088 describe such carbon plasma arc processes for producing carbon nanotubes. Another process type involves simply isolating naturally formed carbon nanotubes from graphite and soot. Such an isolation process for carbon nanotubes is described in U.S. Pat. No. 5,560,898.

The paper "Monodisperse Carbon Nanopearls in a Foam-Like Arrangement: a New Carbon Nano-Compound for Cold Cathodes" by A. Levesque et al. discloses a process for manufacturing generally spherical carbon nanostructures having a diameter of approximately 150 nm. The process employed chemical vapor deposition using nickel nano-cluster-catalyzed dissociation of acetylene at 700° C. As reported in this paper, when the process was performed at 600° C., only carbon nanotubes were produced rather than spherical carbon nanostructures.

The prior processes for producing or isolating carbon nanostructures have been found to produce only small quantities of carbon nanostructures and/or produce carbon nanostructures of inconsistent quality. The low quality carbon nanostructures produced or isolated by the prior methods commonly included metal or other atoms incorporated in the carbon structure. These impurities incorporated in the walls of the carbon nanostructures may have a negative impact on the qualities and properties of the nanostructure and may render it unsuitable for an intended purpose. In particular, prior carbon nanostructure production techniques include no mechanism for preventing non-carbon atoms that may be present in a carbon-bearing feed material from being incorporated into the carbon nanostructure. Also, prior carbon nanostructure production techniques tend to allow carbon from the feed material to become incorporated into the carbon nanostructures in an unpredictable fashion outside of the desired interconnected carbon array structure. This inclusion of amorphous carbon in the resulting carbon nanostructure greatly degrades the properties and usefulness of the resulting carbon nanostructure.

SUMMARY OF THE INVENTION

The present invention provides methods for placing carbon in condition to form substantially impurity-free carbon nanostructures. The present invention also encompasses a novel spherical carbon nanostructure.

A preferred method for producing carbon nanostructures according to the invention includes injecting acetylene gas into a reactant liquid. The injected acetylene molecules are then maintained in contact with the reactant liquid for a period of time sufficient to break the carbon-hydrogen bonds in at least some of the acetylene molecules, and place the liberated, triple-bonded carbon C2 ions (which may also be referred to as "acetylide" ions) in an excited state. This preferred method further includes enabling the liberated carbon C2 ions in the excited state to traverse a surface of the reactant liquid and enter a collection area. Collection surfaces are provided in the collection area to collect carbon nanostructures.

As used in this disclosure and the accompanying claims an "excited state" will refer to the valence state for the particular material. For example, the heat from the preferred 1650° F. aluminum reactant liquid supplies the required energy to change graphite, that is ground state carbon, from atomic carbon into the divalent 3P energy state (requiring 10.19 EV per atom), then to the 5S energy state (requiring another 1.88 EV per atom), and finally to the SP3 hybrid state, or valence state (requiring another 8 EV per atom). The "excited state" for the C2 acetylide ions thought to be produced according to the present invention also refers to the valence state of the C2 acetylide carbon ions.

The designation "carbon ion" will be used in this disclosure and the accompanying claims to refer to any single carbon atom or any group of bonded carbon atoms that have a net charge due to reaction between a carbon-bearing feedstock material with the reactant liquid. The acetylene feedstock described above reacts with the reactant liquid to produce a carbon ion made up of a pair of triple-bonded carbon atoms (thus referred to as an acetylide ion). Feedstock materials containing a single pair of double-bonded carbon atoms, for example, may react with a reactant liquid according to the present invention to produce a carbon ion made up of a pair of double-bonded carbon atoms, which may be referred to as an ethyleneide ion. It will be noted that both of the triple-bonded carbon ion and the double-bonded carbon ion are C2 ions.

The process of reacting the acetylene with the reactant liquid according to the invention also liberates hydrogen atoms from the acetylene molecules. This liberated hydrogen may be vented from the collection area. Some forms of the invention also inject an inert gas into the reactant liquid together with the acetylene. This inert gas is also preferably vented from the collection area.

The method may further include adding heat to the collection area with a heater element. For example, one or more heater elements such as electrical resistance heater elements may be included in the collection area, and operated to heat both the collection area and the collection surfaces provided in the collection area.

One preferred carbon nanostructure production process employs substantially pure liquid aluminum (99% aluminum by mass composition) at approximately 1650° F. as the reactant liquid. This reactant liquid has been found to liberate the desired carbon ions, and place these ions in the desired excited energy state for the production of carbon nanostructures. The process of producing carbon nanostructures may include heating the collection surfaces to between approximately 1350° F. and 1620° F. The process may also be performed without applying any heat to the collection surfaces other than heat from the reactant liquid and any heat released from the formation of carbon nanostructures. For example, the process of producing spherical carbon nanostructures may be performed with the temperature of the collection surfaces ranging from approximately 100° F. to 590° F. All of the spherical carbon nanostructures produced by the above-described preferred process have been produced without any nickel catalyst or other catalyst deposited on the collection surfaces. It should be noted that the nanospheres produced using the liquid aluminum reactant liquid are thought to be nucleated by metal vapors located just above the surface of the reactant liquid. It is believed that the nanospheres form or begin to form as the high energy excited C2 triple-bonded carbon ions traverse the surface of the reactant liquid and mingle with the metal vapors just above the surface of the reactant liquid.

Based on an analysis of the acetylene feedstock material used in processes according to the present invention and of the energy available in the preferred aluminum reactant liquid, it is believed that the spherical carbon nanostructures collected from the above-described processes are composed of one or more chains of carbon atoms arranged with alternating triple and single bonds between adjacent carbon atoms in each chain. In particular, it is believed that the reactant liquid supplies the required energy to break the carbon-hydrogen bonds in the acetylene molecules and place the resulting acetylide carbon C2 ions in the high energy, valence state, but leaves the triple carbon bond intact. These valence state acetylide carbon C2 ions are believed to then combine using the remaining bond site for each carbon atom in the triple-bonded carbon C2 ion to make the alternating triple and single bond structure of carbon atoms.

These and other advantages and features of the invention will be apparent from the following description of the preferred embodiments, considered along with the accompanying drawings.

BRIEF DESCRIPTION OF THE DRAWINGS

FIG. 2 is a diagrammatic representation of an apparatus embodying the principles of the invention showing the relationship between the reactant liquid bath, collection chamber, loading chamber, and collection structure when the apparatus is being prepared to receive the collection structure in position to collect carbon nanostructures.

FIG. 3 is a diagrammatic representation similar to FIG. 2, but showing the condition of the apparatus when it is producing and collecting carbon nanostructures.

DESCRIPTION OF PREFERRED EMBODIMENTS

The claims at the end of this application set out novel features which the Applicant believes are characteristic of the invention. The various advantages and features of the invention together with preferred modes of use of the invention will best be understood by reference to the following description of illustrative embodiments read in conjunction with the drawings introduced above.

Figure 1:
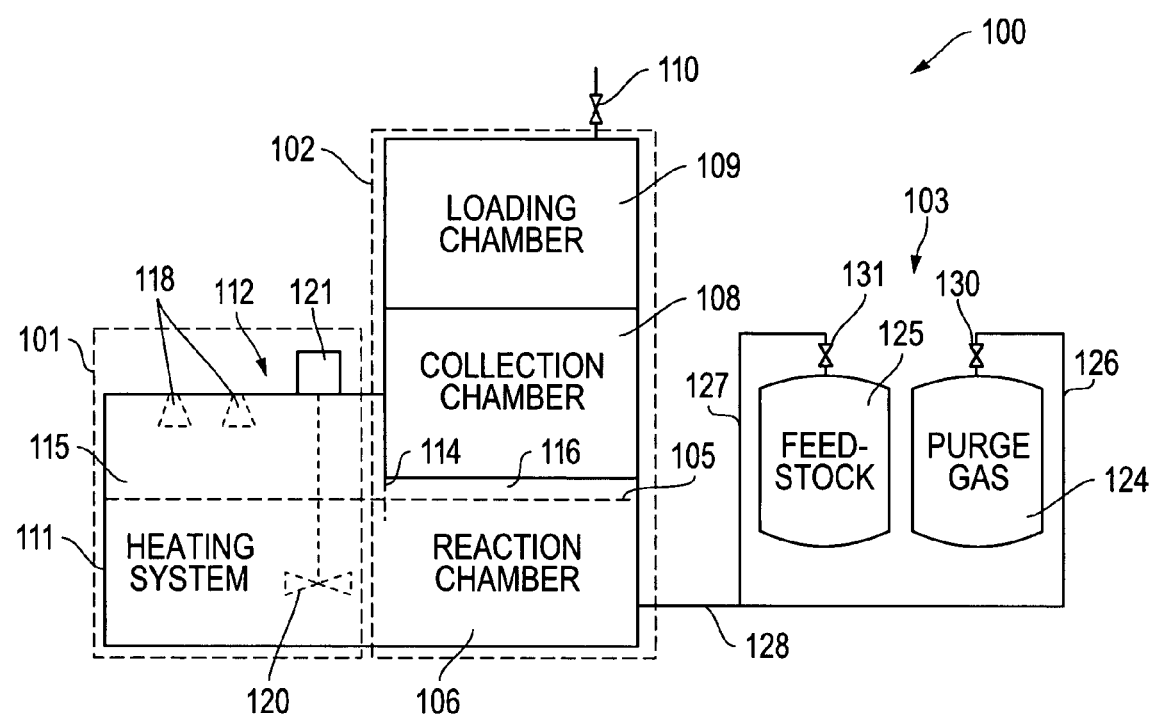
FIG. 1 is a diagrammatic representation of an apparatus that has been employed to produce spherical carbon nanostructures according to the present invention.

Referring to the diagrammatic representation of FIG. 1, an apparatus 100 for producing carbon nanostructures according to the present invention includes a number of components that can be separated generally into three interrelated systems, a heating system shown in dashed box 101, a nanostructure production and collection system ("production system") shown in dashed box 102, and an injection system shown generally at reference numeral 103. A reactant liquid, the surface level of which is shown at 105 in FIG. 1, is heated in heating system 101 and circulated between that system and a reaction chamber 106 of production system 102. Injection system 103 allows a stream of feedstock material and/or purge gas to be injected into reaction chamber 106 at a point below the level 105 of reactant liquid in the reaction chamber. In addition to reaction chamber 106, production system 102 further includes a collection chamber 108 and a loading chamber 109.

In the operation of apparatus 100, the carbon-bearing feedstock material injected into reaction chamber 106 below the surface level 105 of the reactant liquid in the reaction chamber, reacts quickly with the reactant liquid to produce chemically excited carbon ions containing one, two, or more carbon atoms, depending upon the nature of the feedstock. The chemically excited carbon ions together with materials such as hydrogen released from the feedstock molecules and together with any purge gas atoms traverse the surface 105 of the reactant liquid in reaction chamber 106 and flow up into collection chamber 108. Above the reactant liquid and in collection chamber 108, the carbon ions chemically combine with other carbon ions to form carbon nanostructures and collect on removable collection surfaces in the collection chamber. These collection surfaces will be shown and described further below in connection with FIGS. 2, 3, 5 and 6. Other atoms such as hydrogen atoms and purge gas atoms, eventually escape through a pressure relief valve 110 associated with loading chamber 109. After a desired collection period, the collection surfaces (not shown in FIG. 1) are removed from collection chamber 108 and cooled in loading chamber 109. Ultimately, the collection surfaces are removed from loading chamber 109, and the carbon nanostructures that have collected on the collection surfaces are removed from those surfaces. Further details of the operation of apparatus 100 will be described below in connection with FIGS. 2-6.

Reaction chamber 106 comprises a vessel suitable for containing a bath of a desired reactant liquid. The particular reactant liquid used in the examples described below comprises substantially pure liquid aluminum (99% aluminum by mass composition) at a temperature of approximately 1650° F. (between about 1642° and 1655° F., and the vessel included in reaction chamber 106 is lined with a suitable refractory material which will not react with the liquid aluminum. Heating system 101 supplies the heat necessary to at least keep the reactant liquid at the desired temperature necessary to produce the desired reaction with the feedstock and chemically excite the resulting carbon ions to the desired valence level. Thus, heating system 101 also includes a vessel 111 adapted to contain the reactant liquid and apply heat to the liquid to maintain the desired temperature in the liquid. A circulation device 112 is also preferably associated with heating system 101 and/or reaction chamber 106 to provide the desired circulation between the vessel included in the reaction chamber and the vessel associated with the heating system 101. In the preferred arrangement shown in FIG. 1, the heating system vessel 111 and the vessel making up reaction chamber 106 comprise essentially a single vessel separated by a baffle 114 that forms a barrier between a heating area 115 associated with heating system 101 and an area 116 above the reactant liquid level 105 in reaction chamber 106. The heating system 101 shown in FIG. 1 includes burners 118 for burning a suitable fuel to heat the material on the heating system side of baffle 114. The circulation device 112 shown in FIG. 1 includes a stirring element 120 which is driven by a motor 121 to provide the desired circulation under baffle 114.

The invention is not limited to the particular arrangement of heating system 101 and reaction chamber 106 shown in FIG. 1. For example, rather than heating the reactant liquid with combustible fuels as shown in FIG. 1, electrical induction heating or any other suitable heating arrangement or combination may be used to hold the reactant liquid at the desired temperature. In any-case, the initial heating of the reactant liquid may be accomplished in heating system (such as system 101) or in a separate system (not shown) which feeds the pre-heated reactant liquid into the heating system. Furthermore, processes according to the present invention may be performed in a system in which the reaction chamber includes a vessel separate from the vessel associated with the heating system and in which a suitable connection between the separate vessels allows the desired circulation of the reactant liquid between the vessels. Where electrical heating arrangements are used to heat the reactant liquid, the heating may in fact occur in at least a portion of the reaction chamber itself, and thus a separate heating vessel may not be required. The present invention encompasses any arrangement by which the desired reactant liquid may be held at the desired temperature for reacting the feedstock material as will be described further below.

Injection system 103 includes a purge gas vessel 124 and a feedstock vessel 125 connected by suitable conduits 126 and 127, respectively, to an injection conduit 128. The flow of material through conduits 126 and 127 is controlled by control valves 130 and 131, respectively. Injection conduit 128 terminates at reaction chamber 106 so that materials from the vessels 124 and 125 may be injected into the liquid reactant material in the reaction chamber. Purge gas vessel 124 preferably contains a suitable inert purge gas such as argon which may be continuously injected into the system to prevent the reactant liquid from flowing into injection conduit 128. The purge gas is also used to purge the system of air as will be discussed below in connection with FIGS. 2 and 3. Feedstock vessel 125 contains the material that is to be reacted with the reactant liquid in reaction chamber 106 to produce chemically excited carbon ions which combine in the system to produce the desired carbon nanostructures. It will be appreciated that the injection system 103 shown in FIG. 1 is shown only diagrammatically and that other valves and control devices may be included in the various conduits to direct feedstock and/or purge gas into reaction chamber 106 as desired according to the invention.

Further details regarding production system 102 may be described in connection with FIGS. 2 and 3. In particular, FIGS. 2 and 3 show a reaction tunnel structure 201 in reaction chamber 106, heater elements 202 in collection chamber 108, and an insulating slide door 204 made of steel or other suitable material interposed between the collection chamber and loading chamber 109. FIGS. 2 and 3 also show a collection/recovery arrangement shown generally at reference numeral 206. Collection/recovery arrangement 206 includes a collection structure 207 and an insulating plate 208 both connected to a manipulating structure 210.

Reaction tunnel structure 201 is included in the system to help increase the contact time between the feedstock material and reactant liquid and thereby ensure the desired decomposition and chemical excitation of the feedstock material. Reaction tunnel 201 also causes the input material to rise through the reactant liquid generally in the center of reaction chamber 106. The purge gas and/or feedstock injected into reaction chamber 106 follows the path generally shown at arrow 212 and FIGS. 2 and 3. Reaction tunnel 201 preferably comprises an inverted U-shaped structure formed from a suitable refractory material or having a refractory material exterior to withstand contact with the reactant liquid in reaction chamber 106.

Heater elements 202 are included in collection chamber 108 to help control the temperature within the collection chamber and the temperature of the collection structure as will be described further below. In one preferred arrangement, heater elements 202 comprise electrical resistance heater elements that extend along one or more sides of collection chamber 108. Although not shown in FIGS. 2 and 3, it will be appreciated that a suitable power supply supplies electrical power to heater elements 202 as required to control the temperature in the collection chamber 108 and collection structure 207.

Collection structure 207 is included in the production system 102 to provide appropriate collection surfaces on which carbon nanostructures may collect according to the present invention. Further details of one preferred collection structure will be described in connection with FIGS. 5 and 6. It will be noted by comparing FIGS. 2 and 3 that collection structure 207 may reside in two different positions in the operation of production system 102. FIG. 2 shows collection structure 207 in an uppermost position in which it is fully contained in loading chamber 109. FIG. 3 shows collection structure 207 in its lowermost position in which it is fully contained in collection chamber 108. Manipulating structure 210 is included in the collection/recovery arrangements 206 to allow collection structure 207 to be positioned alternatively in the uppermost position shown in FIG. 2 and the lowermost position shown in FIG. 3. Insulating plate 208 is included in collection/recovery arrangements 206 to help insulate the loading chamber 109 from the elevated temperatures in collection chamber 108 when collection structure 207 is in its lowermost position shown in FIG. 3. Any suitable material such as spun ceramic wool may be used for insulating plate 208.

Figure 4:
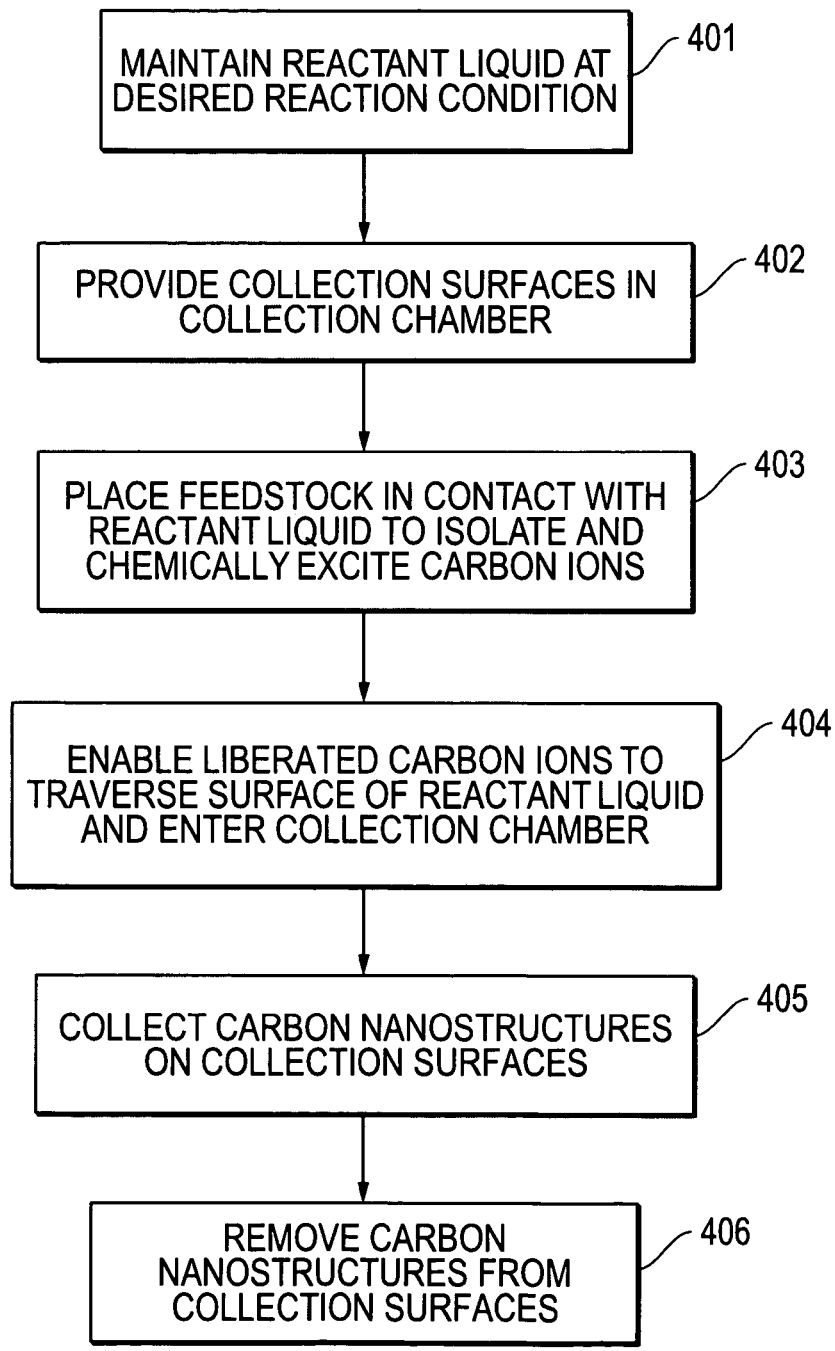
FIG. 4 is a process flow chart showing a process for producing spherical carbon nanostructures according to one preferred form of the present invention.

Processes according to the present invention may be described with reference to the process flow chart shown in FIG. 4 and with reference to the example production system 102 shown in FIGS. 2 and 3. Referring first to FIG. 4, one preferred process according to the invention includes maintaining a reactant liquid in a desired reactant condition as indicated at process block 401. This desired reactant condition is one in which the feedstock will react with the reactant liquid to chemically separate carbon atoms from other constituents in the feedstock material and chemically excite the resulting carbon ions. As shown at process block 403 in FIG. 4, the preferred process includes placing a suitable carbon-bearing feedstock in contact with the reactant liquid in the desired reactant condition to produce and chemically excite the carbon ions. These liberated carbon ions are then allowed to traverse a surface of the reactant liquid and enter a collection chamber as shown at process block 404. As indicated at process block 405 in FIG. 4, carbon nanostructures are collected on collection surfaces in the collection chamber. These collection surfaces may be provided as indicated at process block 402 in FIG. 4. The collected carbon nanostructures are ultimately removed from the collection surfaces as shown at process block 406.

Referring now to FIG. 2, manipulating arrangement 210 is initially held in its uppermost position for each cycle of operation, with insulating door 204 closed to help isolate loading chamber 109 from the heat associated with the reactant liquid held in reaction chamber 106. In this position, the airlock door (not shown in the figures) associated with loading chamber 109 may be opened to insert collection structure 207 on the receiving structure associated with manipulating arrangement 210, so that the collection structure resides in the position shown in FIG. 2. One preferred receiving structure which allows the collection structure 207 to be removably positioned on manipulating structure 210 will be described below in connection with FIGS. 5 and 6. Once the airlock door associated with loading chamber 109 is closed, the purge gas which is preferably continuously injected into reaction chamber 106 through injection conduit 128 eventually displaces air that has entered loading chamber 109 in the course of loading collection structure 207 to the position shown in FIG. 2. It is noted that insulating door 204 does not provide a gas tight seal between collection chamber 108 and loading chamber 109 when the insulating door 204 is closed, and thus the argon gas preferably continuously injected through injection conduit 128, may continue to flow into loading chamber 109 even when the insulating door is closed in the position shown in FIG. 2.

Once the air is purged from loading chamber 109, production system 102 is ready to be placed in a condition to collect carbon nanostructures. It should be noted that during the time of the operation cycle that the collection structure is either removed from production system 102 or in the loaded initial position shown in FIG. 2, the reactant liquid held in reaction chamber 106 is preferably maintained in the desired reactant condition. Maintenance of the reactant liquid in the desired condition during the injection of carbon-bearing feedstock as described below corresponds to the step shown at process block 401 in FIG. 4.

With the air purged from loading chamber 109, insulating door 204 may be opened and manipulating structure 210 lowered to position collection structure 207 in the position shown in FIG. 3. In this lowermost position, shown in FIG. 3, the surfaces associated with collection structure 207 provide collection surfaces in collection chamber 108 on which carbon nanostructures may collect according to the invention. This provision of collection surfaces occasioned by placing collection structure 207 in the position shown in FIG. 3 corresponds to the step shown at 402 in FIG. 4. In this lowermost position, insulating plate 208 fits loosely over the opening for insulating door 204. This loose fit over the opening for insulating door 204 allows purge gas and other gasses to flow up from collection chamber 108 into loading chamber 109 and ultimately exit production system 102 as indicated by arrow 214.

Once production system 102 is in the position shown in FIG. 3, purge gas alone may still be injected into reaction chamber 106 for a period of time to allow the collection structure 207 to reach a desired operating temperature for the production and collection of carbon nanostructures according to the invention. Heater elements 202 may be operated to help heat the contents of collection chamber 108, including collection structure 207. When the temperature of collection structure 207 and the temperature in collection chamber 108 have reached the desired levels, feedstock or feedstock and purging gas may be injected into reaction chamber 106 as shown at arrow 212 in FIG. 3. According to the invention, carbon ions containing one, two, or more carbon atoms are liberated from the feedstock by reaction with the reactant liquid in reaction chamber 106. This injection of feedstock and production of carbon ions corresponds to the process step shown at block 403 in FIG. 4. These carbon ions rise quickly through the reactant liquid and traverse the reactive liquid surface 105 to flow into collection chamber 108 in accordance with the process step shown at block 404 in FIG. 4. Ultimately, the carbon ions bond together to produce the desired carbon nanostructures and collect on surfaces in collection chamber 108, and particularly surfaces associated with collection structure 207. This collection of carbon nanostructures corresponds to the process step shown at block 405 in FIG. 4. It should be noted that materials released from the feedstock molecules, such as hydrogen in the case of an acetylene feedstock, are able to rise up through collection chamber 108, pass around plate 208 in the position shown in FIG. 3, together with the argon purge gas and eventually exit loading chamber 109. This venting as indicated by arrow 214 in FIG. 3 is preferably accomplished through the pressure relief valve 110 shown in FIG. 1.

After a desired collection period in which feedstock is injected into reaction chamber 106 with production system 102 in the position shown in FIG. 3, the feedstock flow is terminated so that only purge gas continues to flow into reaction chamber 106. Manipulating structure 210 is then used to raise collection structure 207 up to the position shown in FIG. 2. At this point, insulating door 204 may be closed to the position shown in FIG. 2 and collection structure 207 may be allowed to cool as necessary to allow the structure to be removed from loading chamber 109. To remove the collection structure 207, the airlock door (not shown) associated with loading chamber 109 is opened and the collection structure 207 is removed as facilitated by the connection to manipulating arrangement 210. Collected carbon nanostructures on the surfaces of collection structure 207 may then be brushed or scraped off onto a suitable surface and then moved to suitable containers. This removal of carbon nanostructures corresponds to the process step shown at block 406 in FIG. 4. Collection structure 207 may then be readied for another cycle of operation. In one preferred process, the surfaces of collection structure 207 are particle blasted to prepare the surfaces for the next operation cycle.

Figure 5:
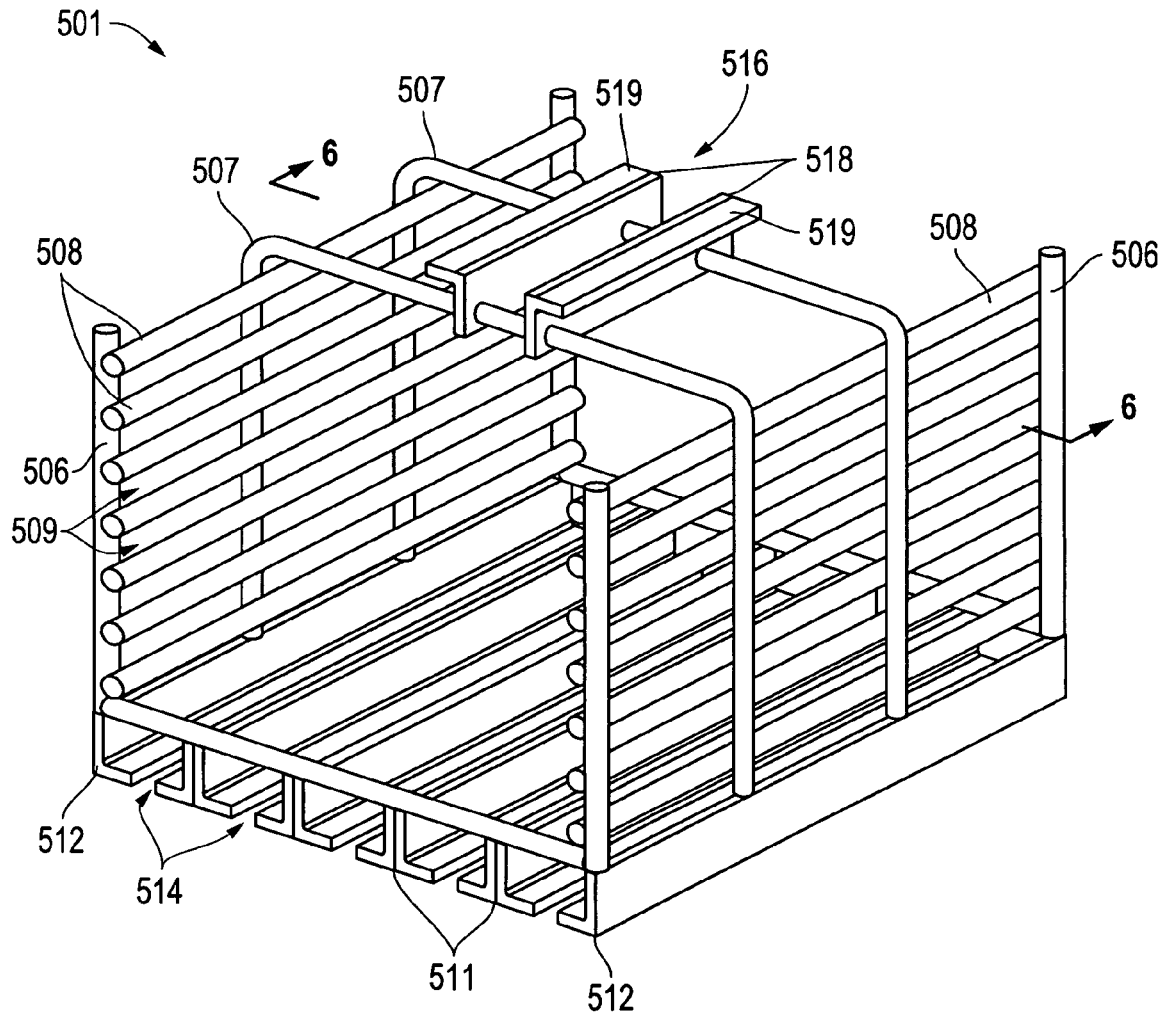
FIG. 5 is an isometric view of a rack used in one preferred collection structure according to the present invention.
Figure 6:
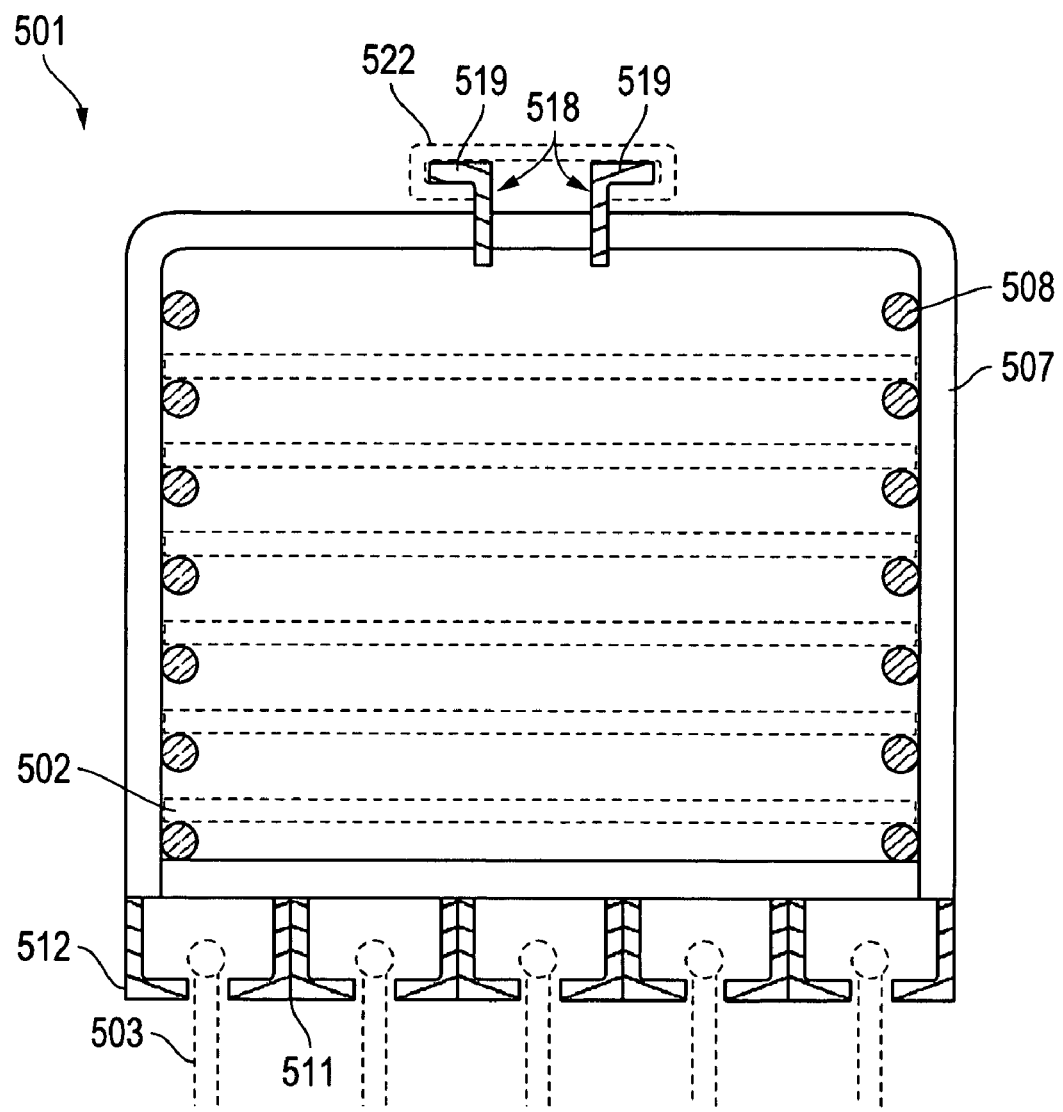
FIG. 6 is a view in section taken along line 6-6 in FIG. 5, and showing collection plates loaded into the rack in phantom lines.

FIGS. 5 and 6 show a rack 501 that may be used as a portion of the collection structure 207 described in connection with FIGS. 2 and 3. This preferred rack 501 supports a number of collection plates which provide the primary collection surfaces for collecting carbon nanostructures according to the invention. In order to more clearly show the rack structure, the isometric view of FIG. 5 shows only rack 501 without the collection plates. However, the section view of FIG. 6 shows the plates 502 and 503 in phantom lines as they would be received on rack 501.

Rack 501 includes four U-shaped members, two upwardly facing U-shaped members 506 with one at either end of the structure, and two downwardly facing U-shaped members 507 spaced apart in a center portion of the rack. A series of rods 508 are connected to these U-shaped members 506 and 507 with the rods spaced apart to providing a series of channels 509 for receiving collection plates 502 shown in FIG. 6. The particular rack 501 shown in FIGS. 5 and 6 includes seven rods 508 on each lateral side of the collection structure producing six separate channels 509 which may each receive a collection plate 502. At the bottom of rack 501 are located a series of spaced apart inverted T-shaped structures 511 and angle members 512 which together form five slots 514 for receiving additional collection plates 503. As indicated in FIG. 6, channels 509 hold collection plates 502 in a horizontal orientation while the slots 514 at the bottom of rack 501 support collection plates 503 in a vertical orientation.

Rack 501 also includes an arrangement for enabling the rack to be removably suspended from the manipulating structure 210 shown in FIGS. 2 and 3. The illustrated connecting arrangement 516 includes two angle members 518 which are connected to the two downwardly opening U-shaped members 507 of rack 501. The outwardly facing upper portions 519 of these angle members 518 may be slidably received in a slot mounted at the bottom of manipulating structure 210. FIG. 6 shows this receiving slot structure 522 in phantom lines. In this arrangement, rack 501 may be loaded into the production system 102 shown in FIGS. 2 and 3 simply by opening the airlock door (not shown) associated with loading chamber 109 and inserting the outwardly extending portions 519 of angle members 518 into the slot formed in slot structure 522 located at the bottom of manipulating structure 210. Conversely the collection structure 207 may be removed simply by sliding the upper portions 519 of angle members 518 off of the receiving slot structure 522 and pulling the collection structure through the open airlock door associated with loading chamber 109 (but not shown in the figures).

Methods of producing carbon nanostructures according to the invention and the particular carbon nanostructures produced by such methods may be described further in connection with the following examples. Each of these examples used a test apparatus as described above in connection with FIGS. 1 through 3 and a collection structure rack as described in FIGS. 5 and 6. Thus, the various elements of the test apparatus described below will retain the same references numbers used for the corresponding elements of the structures shown in FIGS. 1 through 3, 5 and 6. In the test apparatus used for these examples, collection chamber 108 comprised a rectangular chamber having internal dimensions of approximately seventeen (17) inches high, fifteen (15) inches wide, and fifteen (15) inches deep. Three rows of heater elements 202 were included against three walls of the collection chamber generally in the position shown in FIGS. 2 and 3. Reaction chamber 106 in the test apparatus had internal dimensions of approximately twenty-five (25) inches high, fifteen (15) inches wide, and fifteen (15) inches deep. Substantially pure aluminum (99% aluminum by mass composition) at a temperature of approximately 1650° F. (1642° F. to 1655° F.) was maintained in the reaction chamber approximately eighteen (18) inches deep. The feedstock material and purge gas were injected into the reaction chamber at approximately seventeen (17) inches below the surface of the liquid aluminum into a tunnel structure 201 as described above in FIGS. 2 and 3. The outlet end or lip of tunnel structure 201 was positioned generally in the center of the reaction chamber approximately sixteen (16) inches below the surface 105 of the liquid aluminum. In each of the examples, the collection plates 502 (and 503 for Example 1 below) shown in FIG. 6 comprise plates of 304 stainless steel approximately three-sixteenths (3/16) of an inch thick. Each of the horizontally arranged plates 502 was ten and a half (10.5) inches wide, and eleven (11) inches deep, while the vertically oriented plates 503 (used only in Example 1) were approximately five (5) inches high and eleven (11) inches deep. The rack 501 itself as shown in FIGS. 5 and 6 was approximately sixteen (16) inches high, thirteen (13) inches wide, and thirteen (13) inches deep. This arrangement left a clearance of approximately 1 inch between rack 501 and the inner wall of collection chamber 108. Other operating parameters for the test apparatus will be described in connection with the respective example.

Example 1

In one test of the apparatus described above, rack 501 was loaded with six horizontal collection plates 502 spaced approximately one-half inch apart and five vertical collection plates 503 spaced approximately one and one-half (1.5) inch apart. The collection structure 207 made up of rack 501 and loaded collection plates 502 and 503 was then placed into loading chamber 109 suspended on manipulating structure 210 as described above in connection with FIG. 6. The airlock door associated with loading chamber 109 was then closed and the continuously injected argon gas allowed to purge the loading chamber of air that entered as the airlock door was open. After purging loading chamber 109 of air, insulating door 204 was opened and manipulating structure 210 was used to lower collection structure 207 from the position shown in FIG. 2 to the position shown in FIG. 3. In this lowered position, with collection structure 207 residing in collection chamber 108, the lowermost ends of the vertically oriented collection plates 503, resided approximately two (2) inches above the surface 105 of the liquid aluminum reactant liquid. From this point in the collection test, only argon was still continuously injected into the reactant liquid and heater elements 202 were operated to increase the temperature of the collection structure 207 to approximately 1400° F. Once this collection surface temperature was reached, commercial grade acetylene (comprising approximately 48% acetylene and 52% acetone) at room temperature of approximately 70° F. was injected into the reactant liquid at a rate of approximately two (2) liters per minute along with the argon gas also at approximately two (2) liters per minute. This injection of argon gas and acetylene-acetone mixture was continued for a period of approximately two (2) hours until approximately 133 grams of carbon from the acetylene-acetone mixture had been injected. The injection of the acetylene-acetone mixture was then stopped leaving the continuous stream of argon gas at approximately two (2) liters per minute.

Once the injection of the acetylene-acetone mixture was stopped, manipulating structure 210 was used to raise collection structure 207 up into the position shown in FIG. 2, with the collection structure residing in loading chamber 109, and insulating door 204 was closed. Collection structure 207 was then allowed to cool to approximately 212° F. at which point the airlock door associated with loading chamber 109 was opened, and the collection structure was removed to an aluminum foil-covered table top. The vertical plates 503 were removed from rack 501 prior to placing the rack on the foil-covered table. A shiny and powdery appearing, black material was observed on the surfaces of all of the collection plates 502 and 503 and on the surfaces of rack 501 itself. Plastic foam brushes were used to brush off the black material onto the aluminum foil and then the black material was placed into glass sample containers. This test and black material recovery procedure yielded approximately sixty (60) or more grams of the black material.

Figure 7:
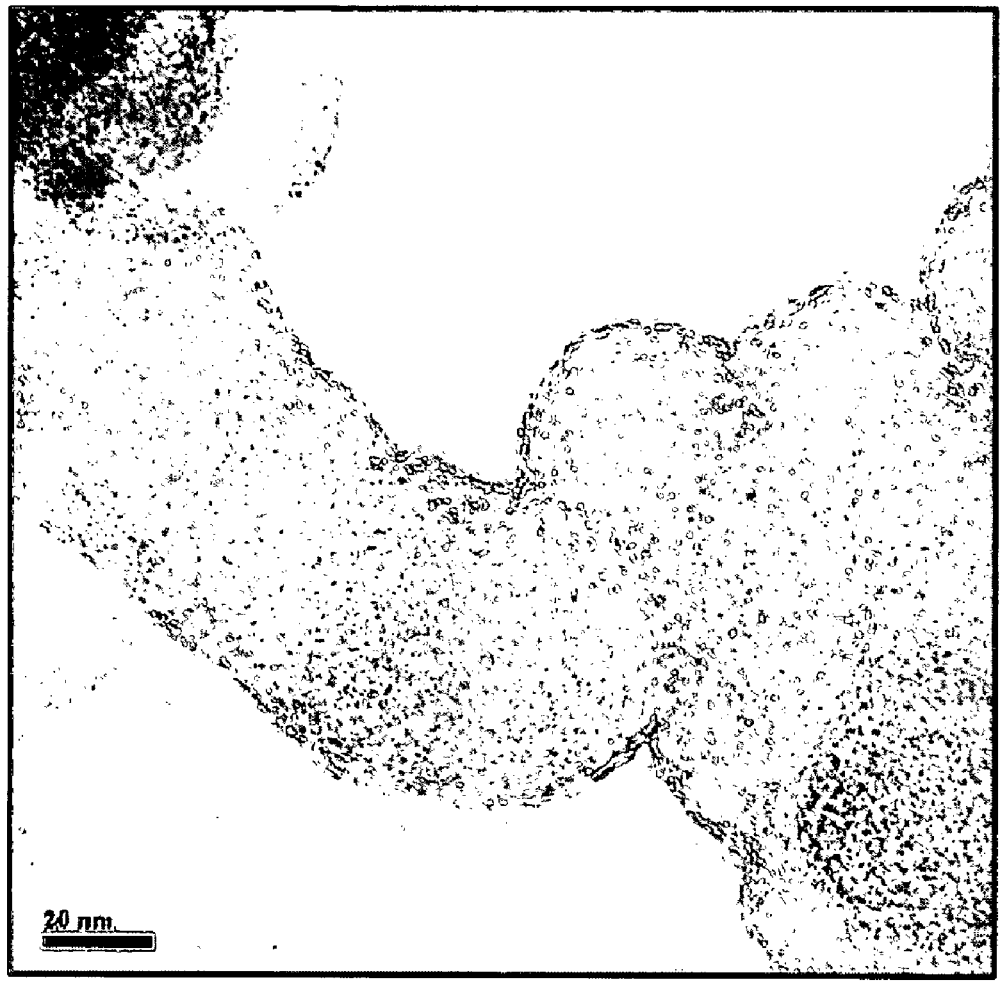
FIG. 7 is a transmission electron microscope image of a sample of material collected in Example 1.
Figure 8:
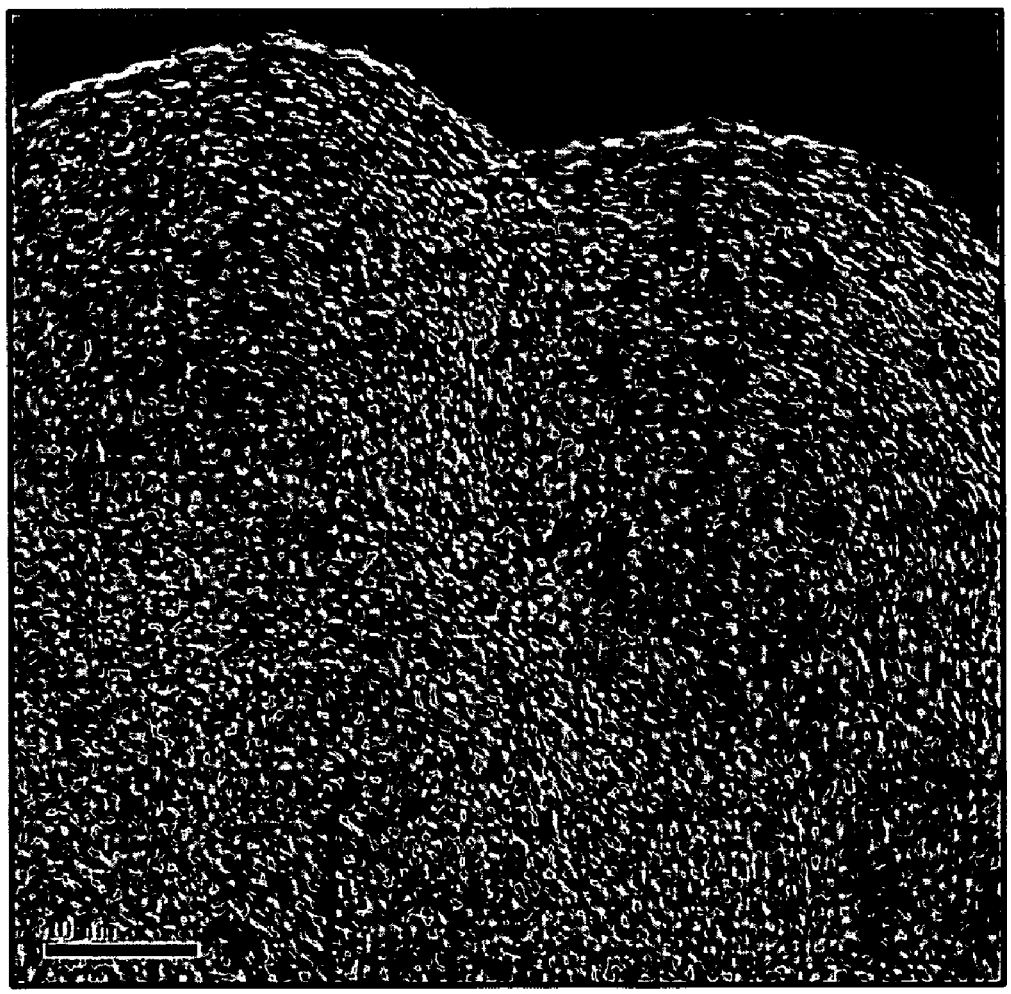
FIG. 8 is a transmission electron microscope image of a sample of material collected in Example 1, but at a higher level of magnification as compared to the image shown in FIG. 7.
Figure 9:
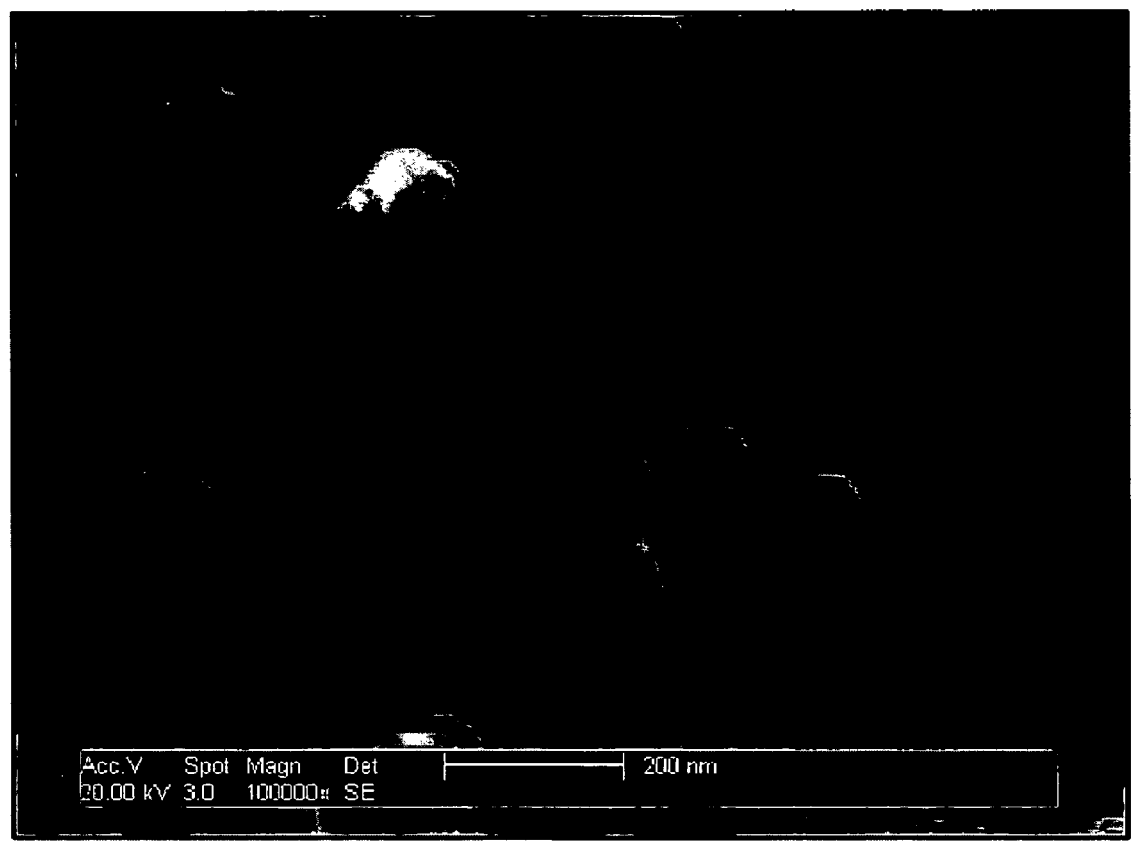
FIG. 9 is a scanning electron microscope image of a sample of material collected in Example 1.
Figure 10:
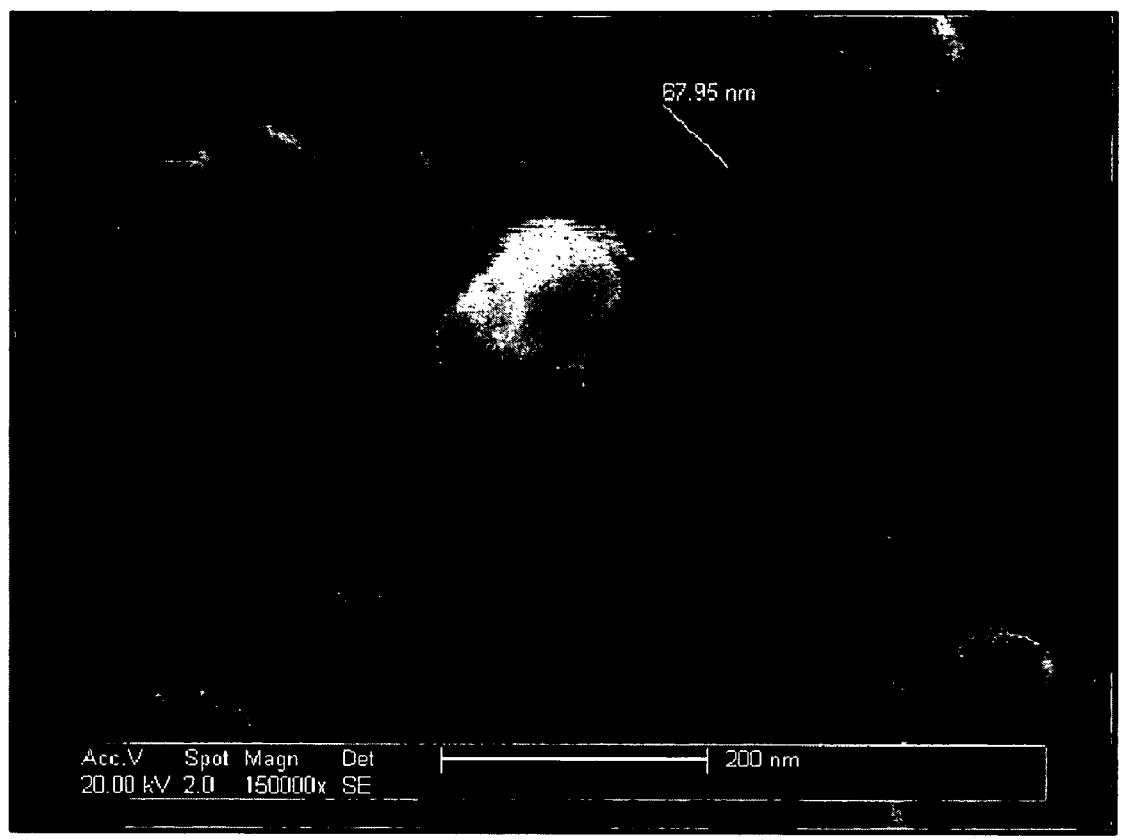
FIG. 10 is another scanning electron microscope image of a sample of material collected in Example 1 including dimension markings for some of the spherical structures.

The black material collected in these sample containers was later examined with a transmission electron microscope (TEM) and scanning electron microscope (SEM). FIGS. 7 and 8 are TEM images of the collected black material. These images show that the black material collected as described above is made up almost exclusively of spherical structures. The TEM image shown in FIG. 8 shows that the spherical structures are highly ordered consistently across the surface of each sphere, and that the spheres appear to be composed of a series of concentric strings of carbon material. These concentric strings appear consistent throughout a significant portion of the surface of the respective spherical structure, that is, throughout 50% or more of the respective sphere surface visible in FIG. 8. FIGS. 9 and 10 are SEM images of this same material collected as described above. These SEM images were taken from the same sample of the collected material which produced the TEM images of FIGS. 7 and 8. The SEM images confirm the uniform spherical structures making up the material. The spherical carbon nanostructures included in the sample material were as small as approximately sixty-two (62) nanometers in diameter as shown in FIG. 10. Energy dispersive spectroscopy (EDS) at two locations in material from this sample having the structure shown in FIGS. 7 through 10 showed that the material was made up largely of carbon with only a small percentage of oxygen. Specifically, one EDS result indicated that the spherical material was 94.37% carbon by mass composition, and 5.03% oxygen by mass composition. The second EDS result indicated the spherical material was 96.43% carbon mass composition and 3.57% oxygen by mass composition. It is believed that the oxygen atoms indicated in the EDS results were not incorporated in the spherical structures themselves, but were extraneous atoms included in among the spherical structures.

The collection process described above was performed seven times in one series of tests. The following table shows the temperatures measured in the collection structure 207 at the start of the acetylene-acetone mixture injection and at the end of the acetylene-acetone mixture injection. TEM and SEM analyses of samples taken from all of these seven test operation cycles showed results similar to those shown in FIGS. 7 through 10.

TABLE 1

| Starting Temperature (° F.) | Ending Temperature (° F.) |
| --- | --- |
| 1394 | 1543 |
| 1378 | 1526 |
| 1375 | 1441 |
| 1521 | 1616 |
| 1415 | 1569 |
| 1370 | 1416 |
| 1527 | 1608 |

It should be noted that the reaction of the acetylene-acetone mixture with the aluminum reactant liquid in this example is believed to produce two different carbon ions, together with hydrogen and oxygen atoms released from the original feedstock molecules. It is believed that the reaction in the reactant liquid releases one triple-bonded C2 carbon ion and two hydrogen atoms from each acetylene molecule. It is believed that the reaction in the reactant liquid also releases two C1 (single carbon atom) carbon ions, one carbon-oxygen ion, and six hydrogen ions from each acetone molecule.

It should also be noted that tests similar to those set out in Example 1 were conducted with various metal catalysts included on the collection surfaces. Iron, cobalt, and nickel catalysts were used in different tests with the acetylene-acetone feedstock. In these tests, with the collection surfaces starting at a temperature of around 1450° F., carbon nanofibers were collected on the collection surfaces rather than the carbon nanospheres shown in FIGS. 7 through 10.

Example 2

Figure 11:
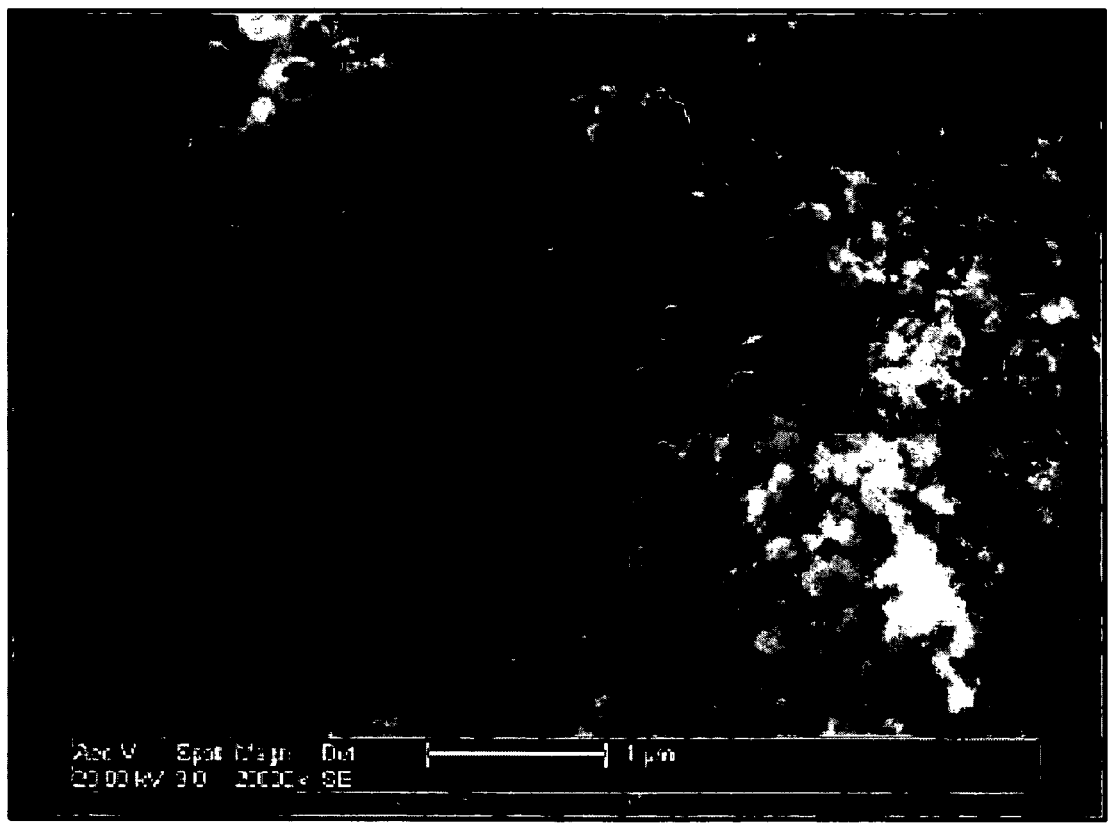
FIG. 11 is a scanning electron microscope image of a sample of material collected in Example 2.
Figure 12:
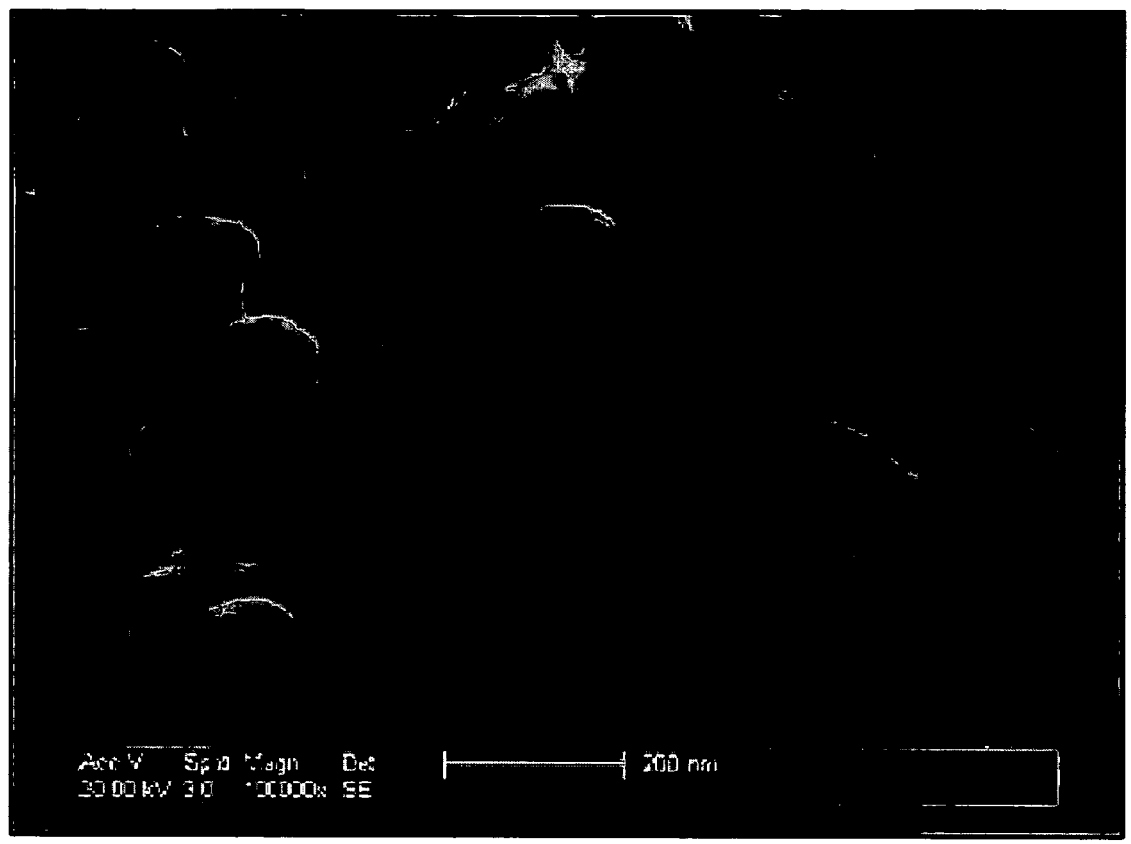
FIG. 12 is another scanning electron microscope image of a sample of material collected in Example 2.
Figure 13:
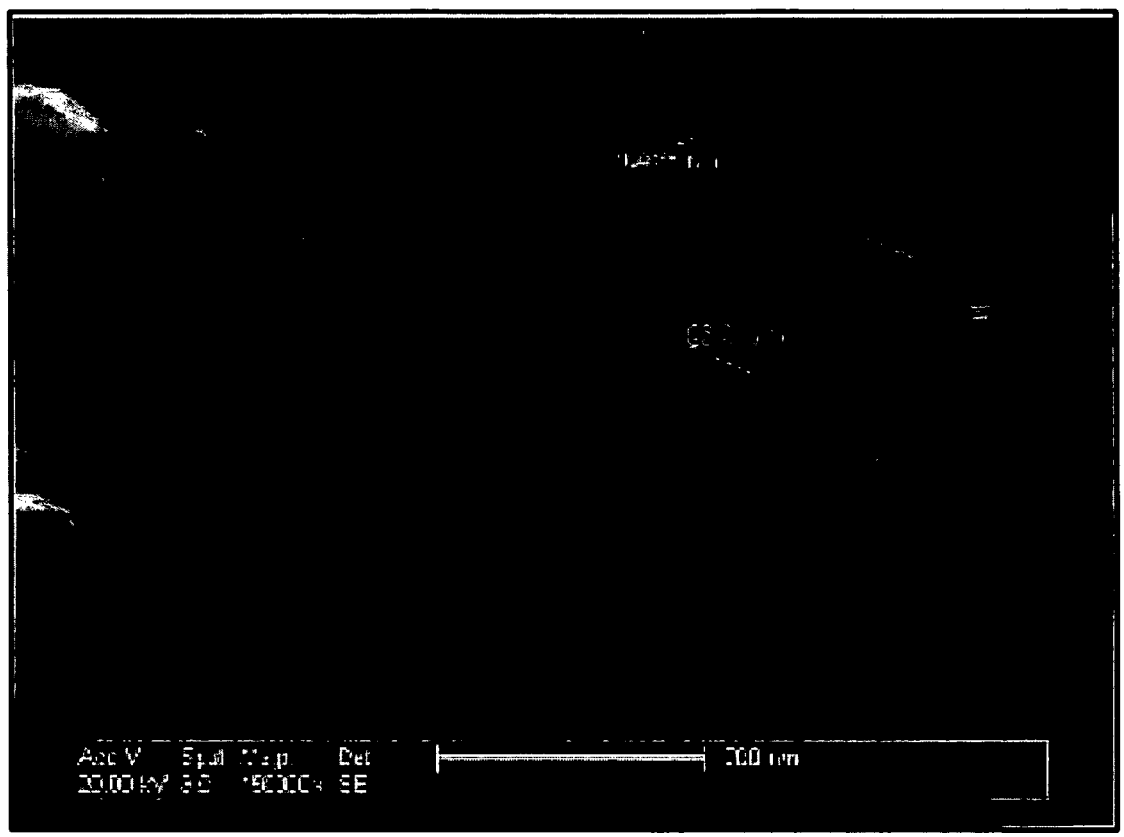
FIG. 13 is another scanning electron microscope image of a sample of material collected in Example 2 including dimension markings for some of the spherical structures.

The same procedure described in Example 1 above was conducted in an additional series of tests each using a lower initial temperature of collection structure 207 prior to starting the injection of the acetylene-acetone mixture, and using only horizontal collection plates 502. In these collection procedures, once collection structure 207 was in the position shown in FIG. 3, heater elements 202 were not activated and the acetylene-acetone mixture was injected immediately, prior to any significant heating of the collection structure. In these tests, the starting temperature of collection structure 207 was approximately 100° F., and the ending temperature was approximately 590° F. Also, for these tests, the flow of acetylene-acetone mixture was increased to seven (7) liters per minute for the injection period of two (2) hours. FIGS. 11-13 show SEM images of material collected from one of these tests. As shown in the SEM images, these tests also produced generally spherical carbon nanostructures with some as small as approximately seventy-one (71) nanometers in diameter. An EDS result for the spherical material from the same sample as the spherical material shown in FIGS. 11-13 indicates the material includes 99.29% carbon by mass composition and 00.71% oxygen by mass composition.

Although the particular TEM and SEM images in the figures show that the spherical nanostructures produced according to Example 1 and Example 2 included spheres well less than 150 nanometers, it is believed that there was a general size difference in the carbon nanospheres produced in the two examples. Qualitatively, the carbon nanospheres produced according to Example 1 appeared to be larger on average than the carbon nanospheres produced according to Example 2.

This apparent size difference resulting from cooler collection surface temperatures in Example 2 suggests that it may be desirable to include some structure in the system to further limit or control the temperature of the collection surfaces during the course of carbon nanostructure collection. One preferred arrangement for limiting or controlling the temperature of the collection surfaces in a collection chamber such as chamber 108 in FIGS. 1-3, includes an arrangement for circulating a temperature controlling fluid through the structures making up the collection surfaces in the system. For example, collection plates 502 or 503 shown in FIG. 6 may include passageways in their interior for circulating a temperature controlling fluid. The fluid may be used to cool the collection surfaces associated with the plates, or heat the collection surfaces further. Such a temperature controlling system would further require a system for conditioning the temperature controlling fluid to the desired state and temperature before circulating the fluid through the plates, and also a suitable device such as a pump or compressor for producing the desired circulation.

A further test similar to the test described in Example 2 was also run substituting substantially pure methane gas for the acetylene-acetone mixture. The methane gas at about 70° F. was injected at a rate of seven (7) liters per minute with the argon gas for a period of time to inject an equivalent amount of carbon into the test system (about 133 grams). This test produced a dull black, powdery material on the collection plates and rack structure. However, this collected material was found to include no apparent carbon nanostructures. Rather, the collected material appeared from SEM scans to be substantially pure carbon either as separate atoms or in collections of atoms too small to be visible in the SEM images.

Figure 14:
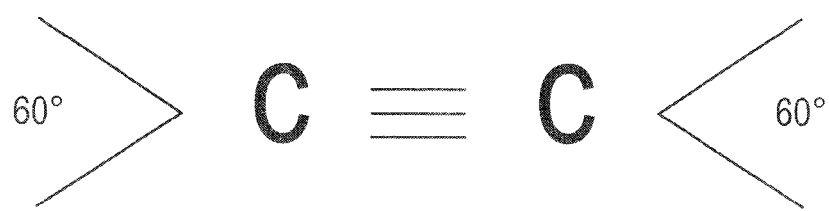
FIG. 14 is a diagrammatic representation showing the chemical structure of a triple-bonded carbon C2 ion (acetylide ion) liberated from the acetylene feedstock according to the invention.
Figure 15:
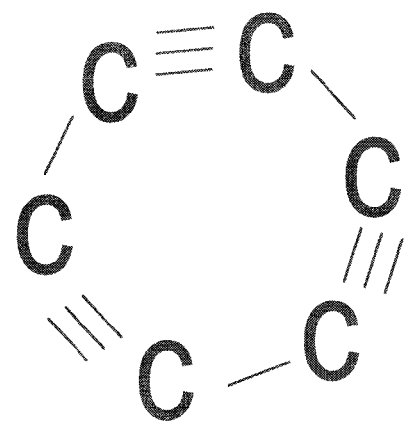
FIG. 15 is a diagrammatic representation showing one potential chemical structure within a spherical carbon nanostructure according to the present invention.

FIG. 14 shows a diagrammatic representation of a carbon ion that is believed to be isolated from acetylene in the reactant liquid. This carbon ion includes the two triple-bonded carbon atoms from the acetylene molecule with two unfilled bond sites at the ends of the structure. As indicated in FIG. 14, a bond may form within a cone of 60 degrees on each end of the carbon ion. This carbon ion is believed to be liberated in the reaction of acetylene and liquid reactant because the energy of the reactant liquid (e.g. liquid aluminum at 1650° F.) is only sufficient to break the carbon-hydrogen bonds in the acetylene molecules and does not affect the carbon triple bond in the acetylene molecules. Based on this carbon ion structure, it is believed that the material produced according to the present invention and the above-described tests includes the atomic structure made up of these carbon ion structures bonded together with single carbon bonds. Furthermore, based on the test with pure methane feedstock which released single C1 carbon ions in the reactant liquid, it is believed that the single C1 carbon ions released from the acetone atoms in Examples 1 and 2 above, are not incorporated in the spherical carbon nanostructures that were produced.

Figure 16:
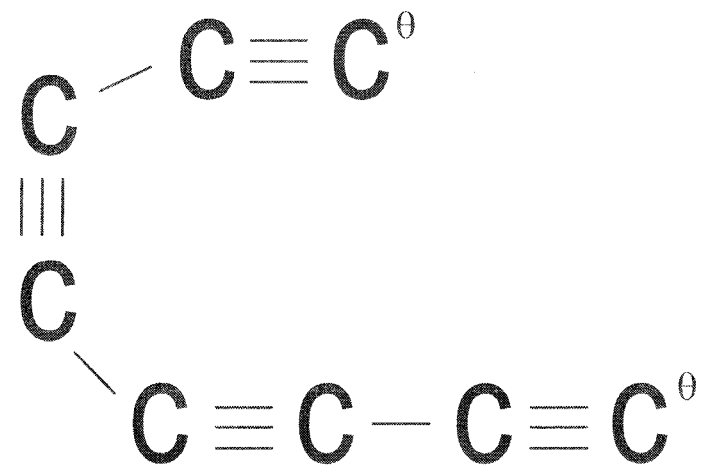
FIG. 16 is a diagrammatic representation showing another potential chemical structure within a spherical carbon nanostructure according to the present invention.
Figure 10:
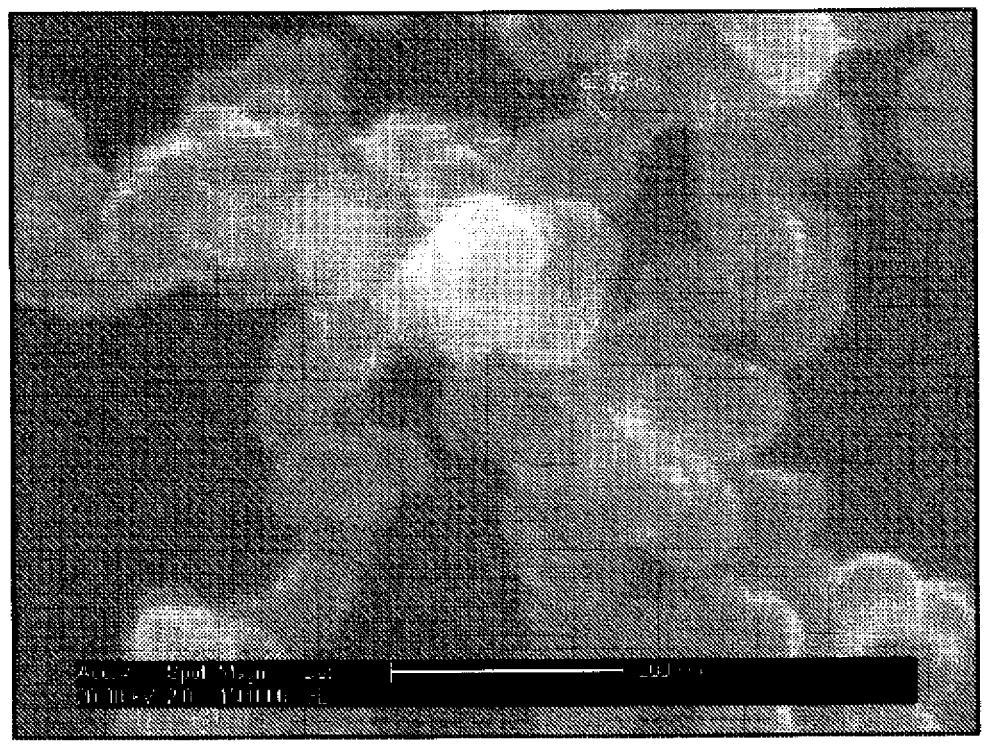
Figure 11:
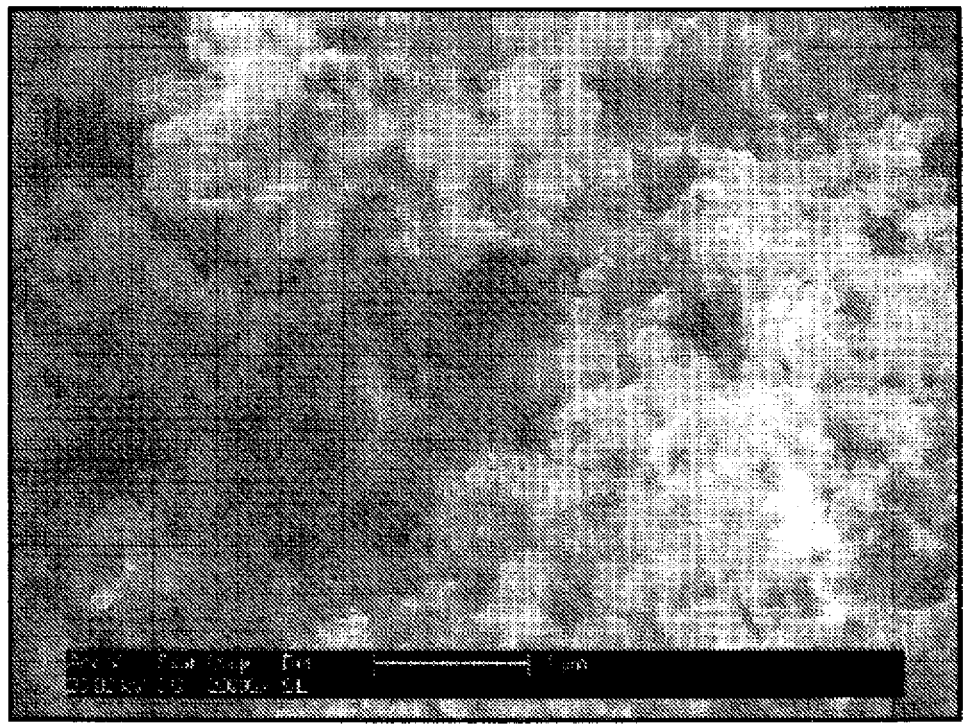
Figure 12:
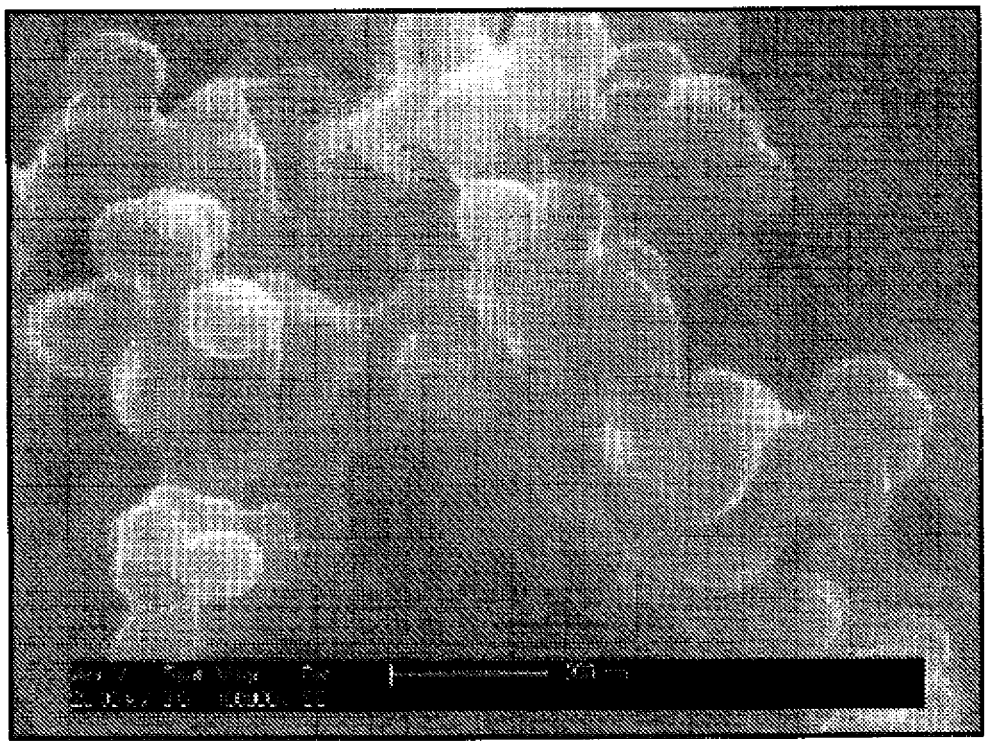
Figure 13:
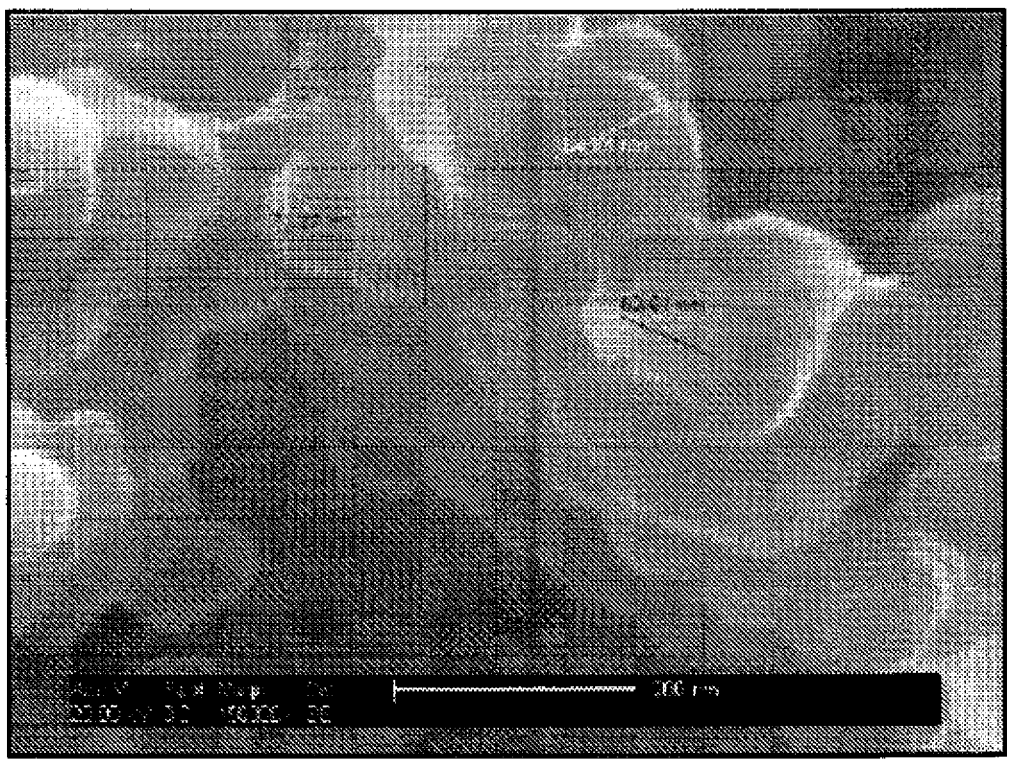
Figure 14:
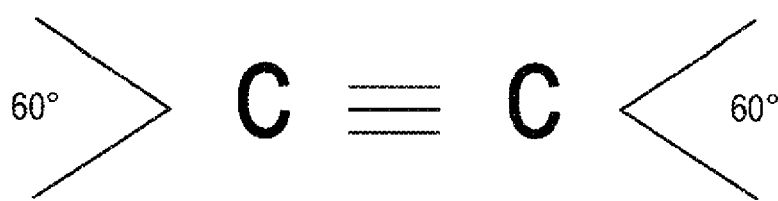
Figure 15:
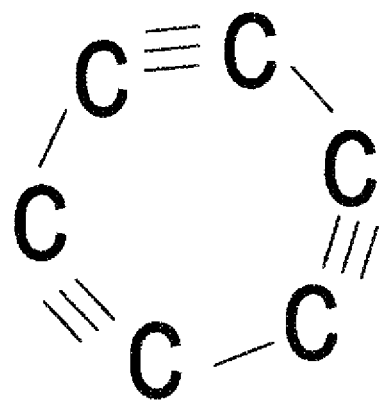
Figure 16:
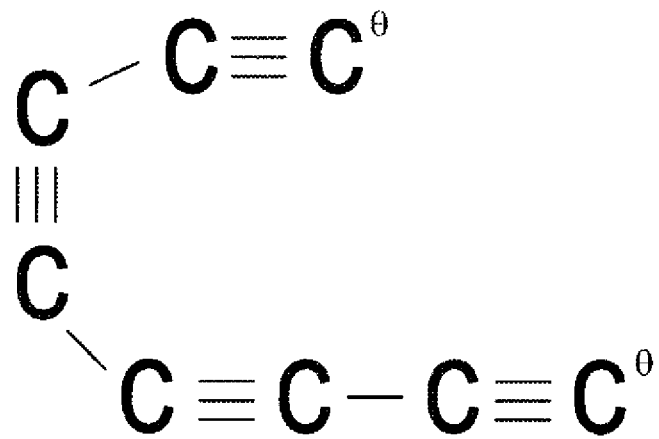

The potential atomic structures of the spherical carbon nanostructures are shown diagrammatically in FIG. 16 or 17. As indicated in both FIGS. 16 and 17, it is believed that the carbon nanostructures are made up of combinations of carbon atoms having alternating triple and single bonds. The carbon atoms may be arranged in rings as indicated in FIG. 16 or in elongated chains as indicated in FIG. 17. The elongated chain shown in FIG. 17 includes one free bond site at each end of the chain. It is unknown why the carbon rings and/or chains form in the spherical structures shown in the TEM and SEM images.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised October 2005), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention. In particular, the present invention is not limited to the particular test apparatus described above in connection with the figures and the examples. Rather, the above-described processes may be performed with substantially any apparatus that (1) allows a carbon-bearing feedstock to be injected into a volume of reactant liquid to facilitate the reaction of the feedstock with the reactant liquid and desired chemical excitation of the resulting carbon ions, and that (2) provides a suitable collection chamber and collection surface. For example, the apparatus shown in U.S. Pat. No. 6,227,126 may be used to provide the desired contact and reaction between the feedstock material and reactant liquid. The entire content of this prior patent is incorporated herein by this reference. Also, it will be appreciated that the present invention is not limited to the substantially pure aluminum reactant liquid. Any other liquid that provides the desired reactions with the carbon-bearing feedstock and chemical excitation of the resulting carbon ions may be used as a reactant liquid according to the invention.

The invention claimed is:

1. A method for producing carbon nanostructures, the method including:
   (a) injecting acetylene into a reactant liquid;
   (b) maintaining the acetylene molecules in contact with the reactant liquid for a period of time sufficient to liberate a respective carbon ion from at least some of the acetylene molecules, and place the liberated carbon ions in an excited state;
   (c) enabling the liberated carbon ions in the excited state to traverse a surface of the reactant liquid and enter a collection area; and
   (d) providing one or more collection surfaces in the collection area to collect carbon nanostructures.

2. The method of claim 1 further including adding an inert gas to the acetylene to produce an acetylene and inert gas mixture, and wherein injecting the acetylene includes injecting the acetylene and inert gas mixture into the reactant liquid.

3. The method of claim 2 further including enabling the inert gas to vent from the collection area together with hydrogen liberated from the acetylene.

4. The method of claim 1 further including adding heat to the collection area with a heater element.

5. The method of claim 1 wherein the reactant liquid includes substantially pure liquid aluminum at approximately 1650° F., the acetylene is injected into the reactant liquid with at least one collection surface at approximately 1350° F. to 1620° F., and metal catalysts are absent from the at least one collection surface.

6. The method of claim 1 further including maintaining the one or more collection surfaces at approximately 100° F. to 590° F.

7. A method for producing carbon nanostructures, the method including:
   (a) injecting acetylene into a reactant liquid comprising substantially pure liquid aluminum at approximately 1650° F.;
   (b) enabling carbon from the injected acetylene to traverse a surface of the reactant liquid and enter a collection area; and
   (c) providing one or more collection surfaces in the collection area to collect carbon nanostructures.

8. The method of claim 7 wherein the acetylene is injected into the reactant liquid at a depth of approximately sixteen inches or more below the surface of the reactant liquid.

9. The method of claim 7 wherein providing one or more collection surfaces in the collection area includes positioning one or more horizontal plates in the collection area.

10. The method of claim 7 wherein providing one or more collection surfaces in the collection area includes positioning one or more vertical plates the collection area.

11. The method of claim 7 further including heating the one or more of the collection surfaces to a temperature of approximately 1350° F. to 1620° F.

12. The method of claim 11 wherein the one or more collection surfaces each comprise a surface of a substrate that is substantially free of metal catalysts.

13. The method of claim 7 further including maintaining the one or more collection surfaces at approximately 100° F. to 590° F.

14. The method of claim 7 wherein the acetylene is injected together with argon gas.

15. A method for producing carbon nanostructures, the method including:
   (a) placing acetylene molecules in contact with a reactant liquid including liquid aluminum to liberate a respective carbon ion from at least some of the acetylene molecules and place the carbon ions in an excited state;
   (b) enabling the carbon ions from the reaction of acetylene with the reactant liquid to escape from the reactant liquid and enter a collection area; and
   (c) providing one or more collection surfaces in the collection area to collect carbon nanostructures.

16. The method of claim 15 further including controlling the temperature of the collection surfaces by applying heat to the collection surfaces with a heater element.

17. The method of claim 16 wherein the temperature of the collection surfaces are maintained from approximately 1350° F. to 1620° F., and metal catalysts are absent from the collection surfaces.

18. The method of claim 16 wherein the temperature of the collection surfaces are maintained from approximately 100° F. to 590° F.

* * * * *

UNITED STATES PATENT AND TRADEMARK OFFICE
CERTIFICATE OF CORRECTION

| | | |
|---|---|---|
| PATENT NO. | : 7,922,993 B2 | |
| APPLICATION NO. | : 11/430743 | |
| DATED | : April 12, 2011 | |
| INVENTOR(S) | : Anthony S. Wagner | |

It is certified that error appears in the above-identified patent and that said Letters Patent is hereby corrected as shown below:

Figures 9-13 are not accurate reproductions of the original drawings (micrographs). The Patentee notes that Figures 9-13 as printed in corresponding U.S. patent No. 7,901,653 B2, are accurate reproductions of these same micrographs.

Delete Figs. 9-13, and substitute therefor Figs. 9-13. (Attached)

At column 6, line 3: change "In any-case," to read --In any case,--.

At column 13, line 52: change "F.)" to read --F)--.

Signed and Sealed this
Seventeenth Day of April, 2012

David J. Kappos
*Director of the United States Patent and Trademark Office*